US009783228B2

United States Patent
Goto

(10) Patent No.: US 9,783,228 B2
(45) Date of Patent: Oct. 10, 2017

(54) INTERMITTENT FAILURE DIAGNOSTIC SYSTEM AND ELECTRIC POWER STEERING APPARATUS PROVIDED WITH THE SAME

(71) Applicant: NSK LTD., Tokyo (JP)

(72) Inventor: Hiroki Goto, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/036,492

(22) PCT Filed: Nov. 13, 2014

(86) PCT No.: PCT/JP2014/080042
§ 371 (c)(1),
(2) Date: May 13, 2016

(87) PCT Pub. No.: WO2015/076173
PCT Pub. Date: May 28, 2015

(65) Prior Publication Data
US 2016/0264173 A1    Sep. 15, 2016

(30) Foreign Application Priority Data

Nov. 22, 2013   (JP) .................. 2013-241642
Apr. 18, 2014   (JP) .................. 2014-086222

(51) Int. Cl.
B62D 5/00   (2006.01)
B62D 5/04   (2006.01)
G05B 23/02  (2006.01)

(52) U.S. Cl.
CPC ....... B62D 5/0481 (2013.01); G05B 23/0235 (2013.01); G05B 23/0275 (2013.01)

(58) Field of Classification Search
None
See application file for complete search history.

(56) References Cited

U.S. PATENT DOCUMENTS 6,658,333 B2 * 12/2003 Kawada ............... B62D 5/049
                                             180/443
6,913,109 B2 *  7/2005 Kodama ............ B62D 5/0484
                                             180/421

(Continued)

FOREIGN PATENT DOCUMENTS

JP   2004-90683 A    3/2004
JP   2004-301568 A   10/2004

(Continued)

OTHER PUBLICATIONS

International Search Report of PCT/JP2014/080042, dated Feb. 24, 2015. [PCT/ISA/210].

(Continued)

*Primary Examiner* — Jonathan M Dager
(74) *Attorney, Agent, or Firm* — Sughrue Mion, PLLC

(57) ABSTRACT

An intermittent failure diagnostic system that, in addition to a failure detection of a conventional failure threshold, appropriately sets an intermittent diagnostic threshold at which a probability of false-positive detection of the intermittent failure is equal to a probability of false-positive detection of the conventional failure, more accurately detects the intermittent failure, suppresses an unprepared system down and improves the reliability, may be used with an electric power steering apparatus.

8 Claims, 8 Drawing Sheets

(56) References Cited

U.S. PATENT DOCUMENTS

| | | | | |
|---|---|---|---|---|
| 7,157,874 B2* | 1/2007 | Nomura | ............... | B62D 5/0496 |
| | | | | 318/432 |
| 7,474,071 B2* | 1/2009 | Koeppl | ............... | B62D 5/0484 |
| | | | | 180/443 |
| 8,055,410 B2* | 11/2011 | Sakamaki | ............ | B62D 5/0487 |
| | | | | 318/400.2 |
| 9,174,675 B2* | 11/2015 | Watanabe | .......... | B62D 15/0245 |
| 9,248,853 B2* | 2/2016 | Kuwahara | .............. | B62D 5/049 |
| 9,446,792 B2* | 9/2016 | Takeda | ................... | B62D 6/008 |
| 2006/0022627 A1* | 2/2006 | Miyazawa | ............ | B62D 5/049 |
| | | | | 318/432 |
| 2008/0066994 A1* | 3/2008 | Fujita | ................. | B62D 5/0463 |
| | | | | 180/446 |
| 2008/0319665 A1* | 12/2008 | Berkobin | ............... | G07C 5/085 |
| | | | | 701/469 |
| 2009/0240389 A1* | 9/2009 | Nomura | ................ | B62D 5/046 |
| | | | | 701/31.4 |
| 2010/0138112 A1* | 6/2010 | Suzuki | ................... | B62D 6/008 |
| | | | | 701/42 |
| 2014/0012469 A1* | 1/2014 | Kunihiro | ............ | B60W 40/072 |
| | | | | 701/41 |

FOREIGN PATENT DOCUMENTS

| | | |
|---|---|---|
| JP | 2006-143359 A | 6/2006 |
| JP | 2011-79350 A | 4/2011 |
| JP | 2011-189788 A | 9/2011 |
| JP | 2011-230634 A | 11/2011 |
| JP | 2012-220485 A | 11/2012 |

OTHER PUBLICATIONS

Written Opinion of PCT/JP2014/080042, dated Feb. 24, 2015. [PCT/ISA/237].

\* cited by examiner

PRIOR ART

PRIOR ART

INTERMITTENT FAILURE DIAGNOSTIC SYSTEM AND ELECTRIC POWER STEERING APPARATUS PROVIDED WITH THE SAME

CROSS REFERENCE TO RELATED APPLICATIONS

This application is a National Stage of International Application No. PCT/JP2014/080042 filed Nov. 13, 2014, claiming priorities based on Japanese Patent Application Nos. 2013-241642, filed Nov. 22, 2013, and 2014-086222, filed Apr. 18, 2014, the contents of all of which are incorporated herein by reference in their entirety.

BACKGROUND OF THE INVENTION

Technical Field

The present invention relates to an intermittent failure diagnostic system to diagnose a failure (abnormality, fault) of an electrical apparatus, an electrical equipment and so on such as an electric power steering apparatus or the like to apply an assist torque to a steering system of a vehicle by a rotational torque of a motor, and in particular to an intermittent failure diagnostic system that detects an intermittent failure by applying a statistics way (a normal distribution probability, an upper-limit side probability and a lower-limit side probability), suppresses an unprepared system down and improves a reliability and to an electric power steering apparatus provided with the same.

Background Art

As an electrical apparatus and an electrical equipment and so on (hereinafter merely refer to "electrical apparatus") comprising an electrical machinery and apparatus and electrical elements and so on, there has been an electric power steering apparatus (EPS) that energizes a steering system of a vehicle by using a rotational torque of a motor as an assist torque, applies an assist force of the motor as the assist torque to a steering shaft or a rack shaft by means of a transmission mechanism such as gears or a belt through a reduction mechanism. In order to accurately generate the assist torque (steering assist torque), such a conventional electric power steering apparatus performs a feedback control of a motor current. The feedback control adjusts a voltage supplied to the motor so that a difference between a current command value and a motor current becomes small, and the adjustment of the voltage applied to the motor is generally performed by an adjustment of a duty ratio of a pulse width modulation (PWM) control.

A general constitution of a conventional electric power steering apparatus will be described with reference to FIG. 1. As shown in FIG. 1, a column shaft (a steering shaft, handle shaft) 2 connected to a steering wheel (handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque Tr of the steering wheel 1, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist command based on the steering torque Tr detected by the torque sensor 10 and a vehicle speed Vel detected by a vehicle speed sensor 12, and controls a current supplied to the motor 20 based on a voltage command value E obtained by performing a compensation and so on with respect to the calculated current command value. Further, it is also possible to receive the vehicle speed Vel from a controller area network (CAN).

The control unit 30 mainly comprises a CPU (or an MPU or an MCU), and general functions performed by programs within the CPU are shown in FIG. 2.

Functions and operations of the control unit 30 will be described with reference to FIG. 2. As shown in FIG. 2, the steering torque Tr detected by the torque sensor 10 and the vehicle speed Vel detected by the vehicle speed sensor 12 are inputted into a current command value calculating section 31. The current command value calculating section 31 calculates a current command value Iref1 based on the steering torque Tr and the vehicle speed Vel. The calculated current command value Iref1 is inputted into a subtracting section 33 through a maximum output limiting section 32 to limit the maximum value. The subtracting section 33 obtains a current deviation Iref3 (=Iref2−i) of the current command value Iref2 of which maximum value is limited and a motor current i being fed back, the current deviation Iref3 is PI-controlled at a PI-control section 34. The PI-controlled voltage command value E is inputted into a PWM-control section 35 and is calculated duty ratios, and the motor 20 is PWM-driven through a motor driving circuit 36 such as an inverter with a PWM-signal PS. The motor current value i of the motor 20 is detected by a motor current detector 37 and is fed back to the subtracting section 33.

In a case that an ordinary failure of the electrical apparatus such as the electric power steering apparatus is settled, although depending on a failure region, it has been processed to settle the failure when a fail-flag to be detected with exceeding a failure threshold is continuously counted from one time to thousands times at a sampling of the detection reading out. In a case of a discontinuous counting, it is difficult to settle as a failure because of the continuous flag is not established. Further, although the discontinuous flag tends to become continuous if the failure threshold is abated, it is a problem to possibly become to a false detection.

FIG. 3 shows a characteristic example of a conventional failure detection in the prior art, and shows an example of a probability density curve in which an upper-limit side failure threshold is set to "5.35V" and a lower-limit side failure threshold is set to "4.85V" by utilizing a characteristic that a sum of output voltages normally becomes "5.10V" in a typical case. An abscissa shows the sum (diagnostic value) of the output voltages and an ordinate does the probability density.

An operation example of the failure detection in the above case is shown in a flow chart of FIG. 4. That is, the sum of the output voltages is measured in an every 1 ms (Step S1), and it is judged whether the measured value (diagnostic value) of the output voltages is equal to or less than "4.85V" of the lower-limit side failure threshold or not (Step S2). In a case that the measured value is equal to or less than "4.85V", the counting by the fail-counter is performed (Step S4). In a case that the measured value of the output voltages exceeds "4.85V" of the lower-limit side failure threshold, it is further judged whether the measured value of the output voltages is equal to or more than "5.35V" of the upper-limit side failure threshold or not (Step S3). In a case that the measured value is equal to or more than "5.35V", the counting by the fail-counter is performed (Step S4). In a case that the measured value is less than "5.35V", the operations are repeated by returning to the above Step S1.

The judgement orders of the lower-limit side failure threshold and the upper-limit side failure threshold may be alternative.

At the above counting time of the fail-counter, it is judged whether the counts of the fail-counter are continuously performed 500 times or not (Step S5). In a case that the continuous counting number is less than 500 times, the operations are repeated by returning to the above Step S1, and in a case that the continuous counting number is equal to or more than 500 times, the failure is settled (Step S6).

As stated above, since the failure is settled in the prior art when the continuous counting number exceeds a predetermined number (e.g. 500 times), the discontinuous flag tends to become continuous if the upper-limit side failure threshold and the lower-limit side failure threshold are decreased. However, there is a problem to settle a false detection (misdetection) in spite of the normality Further, as shown in a characteristic diagram of FIG. 5, the fail-counter cannot count the flags between the upper-limit side failure threshold and the lower-limit side failure threshold, it is impossible to detect a neighboring failure which does not exceed the failure threshold. That is, it is impossible to detect the intermittent failure which is a failure based on an irreversible characteristic variation, a characteristic variation due to a secular deterioration or the like.

On the other hand, as a recent requirement of vehicle electronic control devices of the electric power steering apparatus, there is a strong request to detect not only a continuous failure (permanent failure) but also the intermittent failure. It is very difficult to detect the intermittent failure and then settle. For example, if the settlement of the intermittent failure is too early, the system causes down in spite of the assist function of the electric power steering apparatus is possible to use yet and maybe a conflict phenomenon for a life extension ideology of the recent vehicle electronic control.

THE LIST OF PRIOR ART DOCUMENTS

Patent Documents

Patent Document 1: Japanese Published Unexamined Patent Application No. 2012-220485 A1

SUMMARY OF THE INVENTION

Problems to be Solved by the Invention

As a system to diagnose quality of the electrical apparatus (electrical equipment), there has been a way that in advance prepares the data at every states corresponding to kinds of a normal state and an abnormal (failure) state of the electrical apparatus, and diagnoses the normal state or the abnormal state (failure) of the electrical apparatus by judging whether the data obtained from the electrical apparatus data is near what state data at a diagnostic time of the electrical apparatus. Although the above way is necessary to prepare the data at every states corresponding to kinds of a normal state and an abnormal (failure) state before the diagnosis, there are many cases being very difficult to obtain the data at every kinds even if the preparing the normal state data is comparatively easy.

As a system to solve the above problem, Japanese Published Unexamined Patent Application No. 2012-220485 (Patent Document 1) discloses a quality diagnostic system. The quality diagnostic system disclosed in Patent Document 1 comprises a feature amount detecting means to detect due to a current following in an electrical equipment being a diagnostic subject, a calculating/storing means to lead a mean value of the feature amount and a standard deviation obtained in the feature amount detecting means when the electrical equipment is normal and to store them, and a probability calculating means to obtain a probability value existing inside of an ellipsoid determined based on the feature amount obtained by the feature amount detecting means and the mean value and the standard deviation stored in the calculating/storing means when the electrical equipment is diagnosed. Further, the quality diagnostic system has a diagnostic means that synchronously measures currents following in plural phases of the electrical equipment, leads an each phase probability from the currents following the each phase by the probability calculating means, and diagnoses the quality of the electrical equipment based on the probability value obtained by multiplying or adding the probability values obtained at each phase.

Thus, the diagnostic system disclosed in Patent Document 1 sets a single value that absolutely does not exceed in theory at a normal time as the failure threshold, and judges the failure whether the time (counted value) exceeding the failure threshold is within the prescribed time (counting value) or not, but it is impossible to detect the intermittent failure of the hard ware. Namely, there is a problem that it is impossible to detect a neighboring failure (intermittent failure) which does not exceed the failure threshold, and the diagnostic system cannot reply the requirement of the recent electric power steering apparatus (EPS).

The present invention has been developed in view of the above-described circumstances, and an object of the present invention is to provide an intermittent failure diagnostic system that in addition to a failure detection of a conventional failure threshold, sets an intermittent diagnostic threshold inside of the failure threshold or sets the intermittent diagnostic threshold in an arbitrary scope with a detection resolving-power unit, securely detects the intermittent failure in a wide region by using a statistics way, suppresses an unprepared system down and improves the reliability and to an electric power steering apparatus provided with the same.

Means for Solving the Problems

The present invention relates to an intermittent failure diagnostic system comprising a fail-counter to failure-settle 1 on an ordinary diagnosis by calculating a normal distribution based on a mean value and a standard deviation of measured values at a normal state of an electrical apparatus, by setting at least one failure threshold as a diagnostic threshold of the measured values, and by measuring a number or a time of the measured values exceeding the failure threshold, the above-described object of the present invention is achieved by that: wherein the intermittent failure diagnostic system sets an intermittent failure diagnostic threshold for an intermittent failure diagnosis between the mean value and the failure threshold, and the fail-counter measures a number or a time that the measured values exceed the intermittent failure diagnostic threshold; and wherein the intermittent failure diagnostic system sets a counting value or a time to failure-settle 2 on the fail-counter so as to coincide a false-failure probability of the ordinary diagnosis with a false-failure probability of the intermittent failure diagnosis.

Further, the above-described object of the present invention is more effectively achieved by that; wherein the failure threshold is set based on a physical requirement 1, or wherein the physical requirement 1 is a hard ware characteristic or a system usage condition, or wherein the counting value or the time doing to failure-settle 2 is set based on a physical requirement 2, or wherein the physical requirement 2 is at least one of a hard ware characteristic, a system usage condition, a supposing impulse-noise width and a continuous permissible time on a functional safety, or wherein the failure thresholds are set at an upper-limit side and a lower-limit side, and at least one of the intermittent failure diagnostic threshold is set between the failure thresholds and the mean-value, or wherein the failure counting is continuously or discontinuously performed, or wherein the intermittent failure diagnostic threshold is shifted to a whole region of diagnostic values by a detection resolving-power unit and is set.

By providing with the intermittent failure diagnostic system, the electric power steering apparatus of the above object is achieved.

Effects of the Invention

The intermittent failure diagnostic system according to the present invention sets the intermittent failure diagnostic threshold inside of the failure threshold (the upper-limit side: the mean value<the intermittent failure diagnostic threshold<the failure threshold, the lower-limit side: the mean value>the intermittent failure diagnostic threshold>the failure threshold), or sets the intermittent failure diagnostic threshold inside (or outside) of the failure threshold irrespective of the mean value and the failure threshold with a shift of the minimum resolving-power unit of the detected voltages, measures the number or the time exceeding the adjacent intermittent failure diagnostic threshold separated by the set intermittent failure diagnostic threshold or a detection resolving-power unit, and performs the intermittent diagnosis by using the statics way. In this connection, the present invention, in addition to the failure diagnosis (ordinary diagnosis) due to the conventional failure threshold, can diagnose the intermittent failure (including the abnormality) which does not exceed the failure threshold in almost whole region based on the intermittent diagnostic failure threshold (or the adjacent intermittent failure diagnostic threshold separated by the detection resolving-power unit). By making the intermittent failure diagnostic thresholds of upper-limit side and the lower-limit side adjacent with the detection resolving-power unit, it is possible to set by shifting the intermittent failure diagnostic threshold in the whole region of the diagnostic values, the detection impossibility region for the intermittent failure disappears and it is possible to detect the failure for the whole region capable of taking the diagnostic values. With the above wide area intermittent failure diagnosis, it is capable of improving the reliability without the unprepared system down.

The present invention assumes that the distribution of the measured values of the voltage, the current and so on presents the normal distribution, and can diagnose the normality, the failure (including the abnormality) or the intermittent failure for the probability existing outside of the measured values obtained with the measurement of the single parameter based on the value exponentiation-operated with the fail-counter threshold.

Further, the present invention can individually designate the control processing when the failure is settled, for the ordinary diagnosis and the intermittent failure diagnosis.

DETAILED DESCRIPTION OF THE INVENTION

Mode for Carrying Out the Invention

Figure 1:
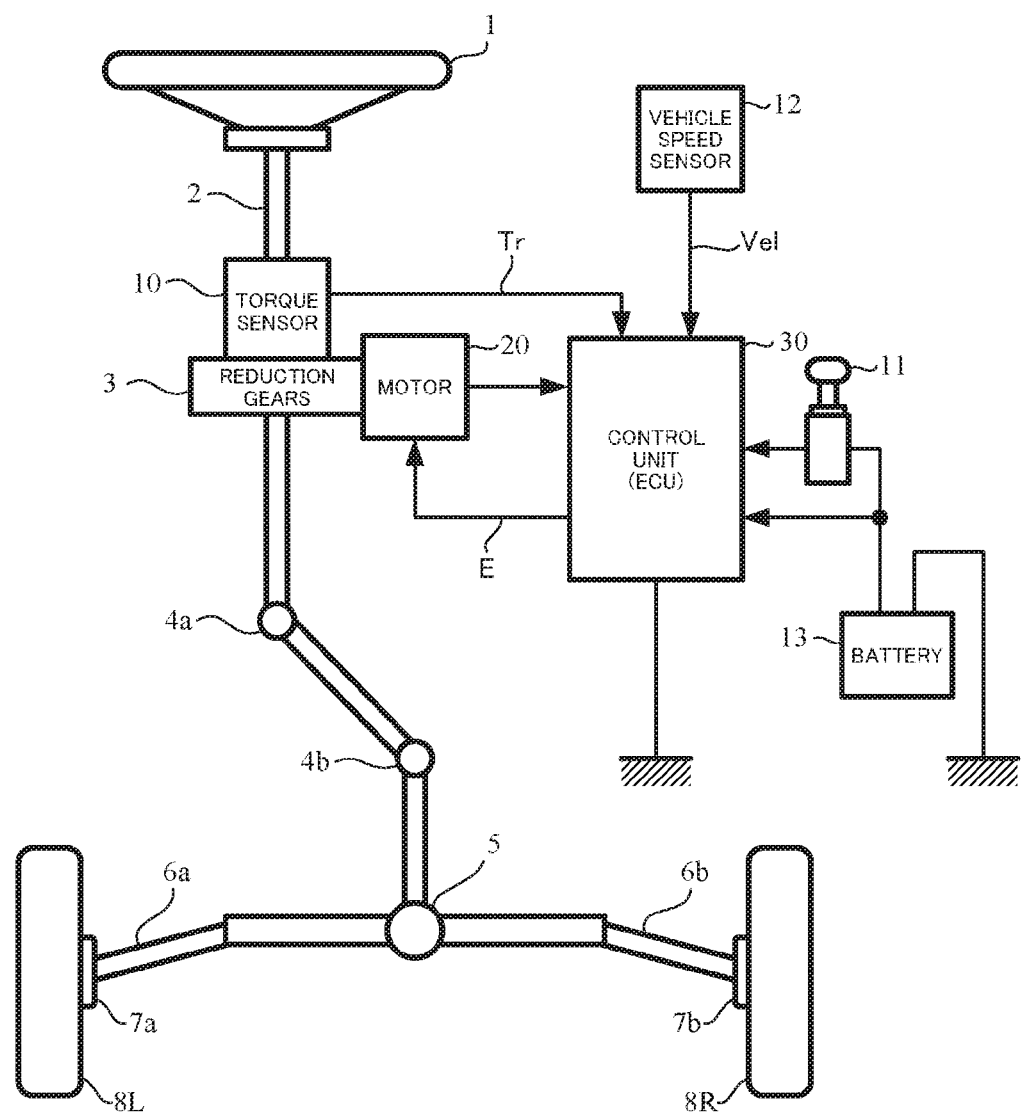
FIG. 1 is a diagram illustrating a constitution example of a general electric power steering apparatus.
Figure 2:
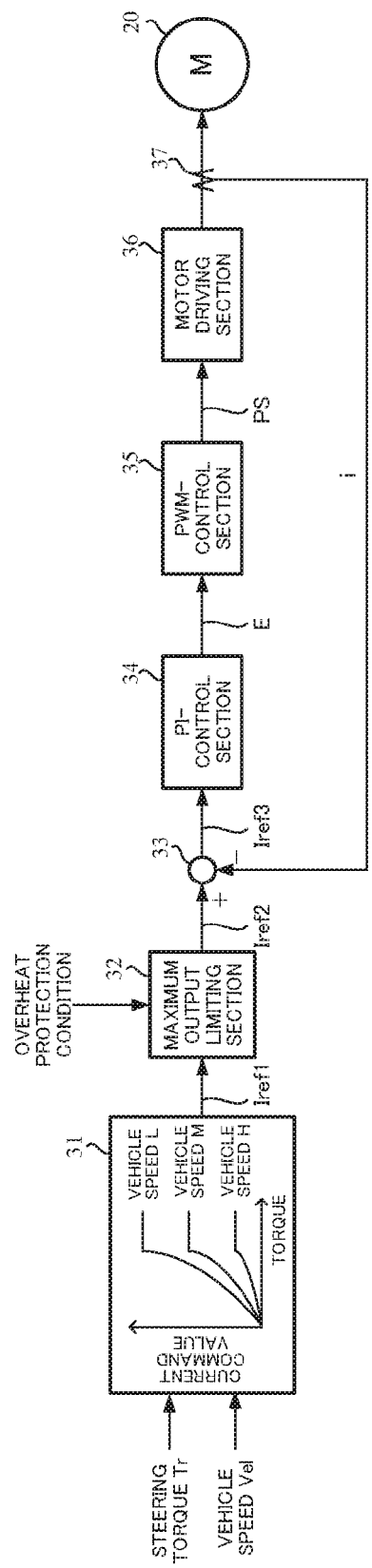
FIG. 2 is a block diagram showing an example of a control system of the electric power steering apparatus.
Figure 3:
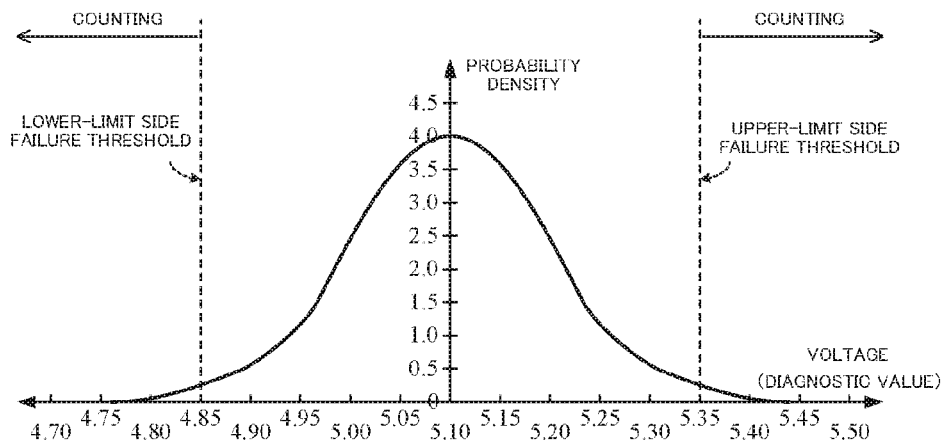
FIG. 3 is a characteristic diagram explaining an example of the conventional failure detection.
Figure 4:
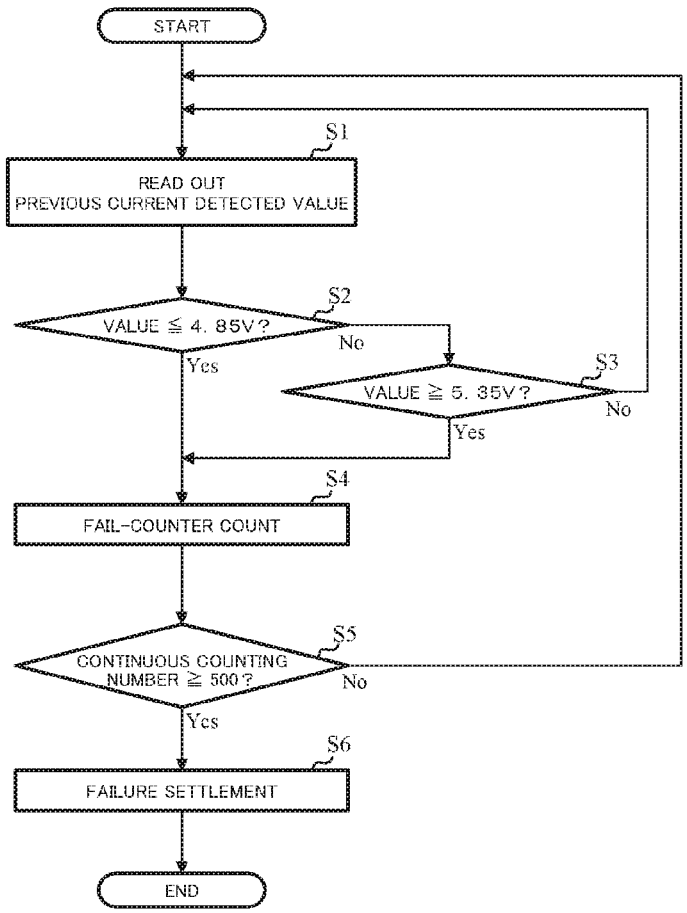
FIG. 4 is a flow chart showing an example of the conventional failure detection.
Figure 5:
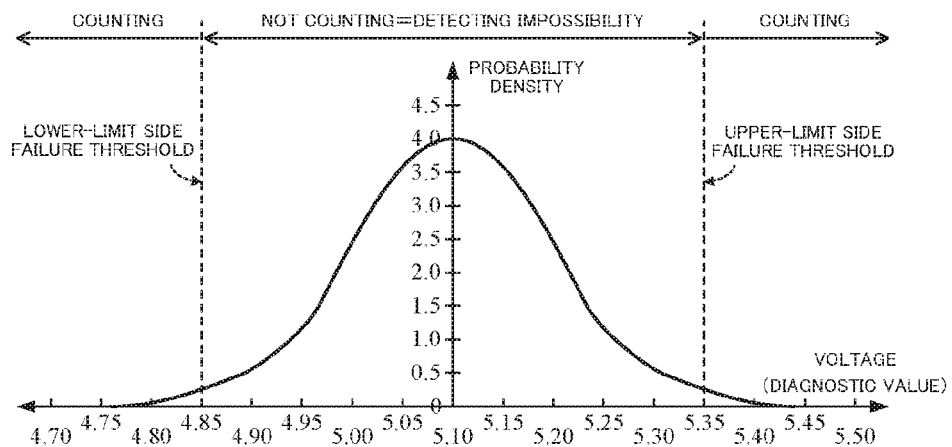
FIG. 5 is a characteristic diagram explaining that the conventional system cannot diagnose the intermittent failure.

A conventional failure diagnosis for an electrical apparatus sets a value that absolutely does not exceed in theory at a normal state as a failure threshold (an upper-limit side, a lower-limit side or both), settles a failure when a time (counting value) exceeding the failure threshold reaches at a prescribed time (counting value) and performs the failure detection (ordinary diagnosis). Consequently, the conventional system cannot detect a neighboring failure (intermittent failure) which does not exceed the failure threshold.

On the contrary, the present invention decides a normal state without reservation when the diagnostics value presents a mean value, sets the intermittent failure diagnostic threshold inside of the failure threshold (the upper-limit side: the mean value<the intermittent failure diagnostic threshold<the failure threshold, the lower-limit side: the mean value>the intermittent failure diagnostic threshold>the failure threshold), and diagnoses the intermittent failure (including the abnormality) with a statics way (a normal distribution probability, upper-limit side and lower-limit side probabilities) based on the intermittent failure diagnostic threshold in addition to the conventional failure detection. Alternatively, in a case that a value which is equal to or more than the mean value (the upper-limit side) or which is equal to or less than the mean value (the lower-limit side) is allowed as a setting scope of intermittent failure diagnostic thresholds of the upper-limit side and the lower-limit side, the present invention sets the intermittent failure diagnostic threshold inside (or outside) of the failure threshold irrespective of the mean value and the failure threshold with a shift of the minimum detection resolving-power unit of the detected voltages, measures the number or the time exceeding the adjacent intermittent failure diagnostic threshold separated by the set intermittent failure diagnostic threshold or detection resolving-power unit, and performs the intermittent diagnosis by using the statics way based on the intermittent failure diagnostic threshold. That is, the present invention assumes that the distribution of the measured values (diagnostic values) of the voltage, the current and so on of the electrical apparatus presents the normal distribution, and can diagnose the normality, the failure or the intermittent failure for the probability existing outside of the measured values obtained by the measurement of the single parameter based on the value exponentiation-operated with the fail-counter threshold.

Generally, the normal distribution probability is obtained from the probability variable, the mean value, the standard deviation, the lower limit which the probability variable exists and the upper limit which the probability variable exists.

As physical requirements for determining the failure threshold, there are, for example, a hard ware characteristic (manufacturing dispersion width), a temperature characteristic (an influence to the diagnostic value due to the temperature change), a power supply voltage characteristic (an influence to the diagnostic value due to the power supply voltage change), a measuring dispersion width of the diagnostic value (a measuring accuracy), a white noise width of the diagnostic value, a dynamical vibration characteristic (an influence to the diagnostic value due to the applying of the dynamical vibration), a system usage condition (a usage temperature range (a temperature scope at a usage position), a usage power supply voltage range (a voltage range of the usage power supply), a dynamical vibration condition (a vibration existence at a usage position)). Further, as the physical requirements for determining the counting value to settle the failure, for example, a hard ware characteristic (a measuring period of the diagnostic value), a system usage condition (a detection time fitted to a usage object of the system (a time from the failure occurrence to the detection)), an assuming impulse-noise width (a pulse width (the false detection is performed if the detection time is shorter than the pulse width) of the impulse-noise on the diagnostic value suddenly occurred with an electrical noise applied from an external region), and a continuous permissible time (a time which becomes a dangerous state due to the functional incompetence when the failure detected by diagnosis continues) for the functional safety are used.

The intermittent failure diagnostic threshold used in the first embodiment of the present invention is set between the mean value (normal value) and the failure threshold due to the conception that the normality is determined without reservation when the diagnostic value presents the mean value. That is, the intermittent failure diagnostic threshold used in the present invention is set one between the normal value (the mean value) and the conventional upper-limit side failure threshold, or is set two between the normal value (the mean value) and the conventional upper-limit side and lower-limit side failure thresholds.

Even if the diagnostic value presents the mean value, the state is considered as the abnormal state that the diagnostic value is fixed when the same value continues a long term. The second embodiment of the present invention aims to add the detection function of the above abnormal state. The second embodiment, irrespective of the mean value and the failure threshold, sets the intermittent failure diagnostic threshold inside (outside) of the failure threshold with a shift by the minimum resolving-power unit of the detected voltages, and diagnoses with the adjacent intermittent failure diagnostic threshold separated by the intermittent failure diagnostic threshold or the detection resolving-power unit.

The problem in the time of setting of the intermittent failure diagnostic threshold is the false detection. Therefore, even if the intermittent failure diagnostic threshold is set, it is necessary to take care of that a false detection characteristic does not become down. Based on the nature of the normal distribution curve, the probability density (frequency) does not become "0" until "∞" (or "−∞") of the probability variable. Accordingly, the present invention surpasses the conventional failure threshold in a low probability at the state having no failure. The present invention handles this probability as the permissible value (limit) of the failure false-detection probability, and carries out so that the false detection characteristic does not become down by making the false-detection probability at the setting time of the intermittent failure diagnostic threshold same with the permissible value of the failure false detection probability.

Hereinafter, embodiments of the present invention will be described with reference to the accompanying drawings.

Figure 6:
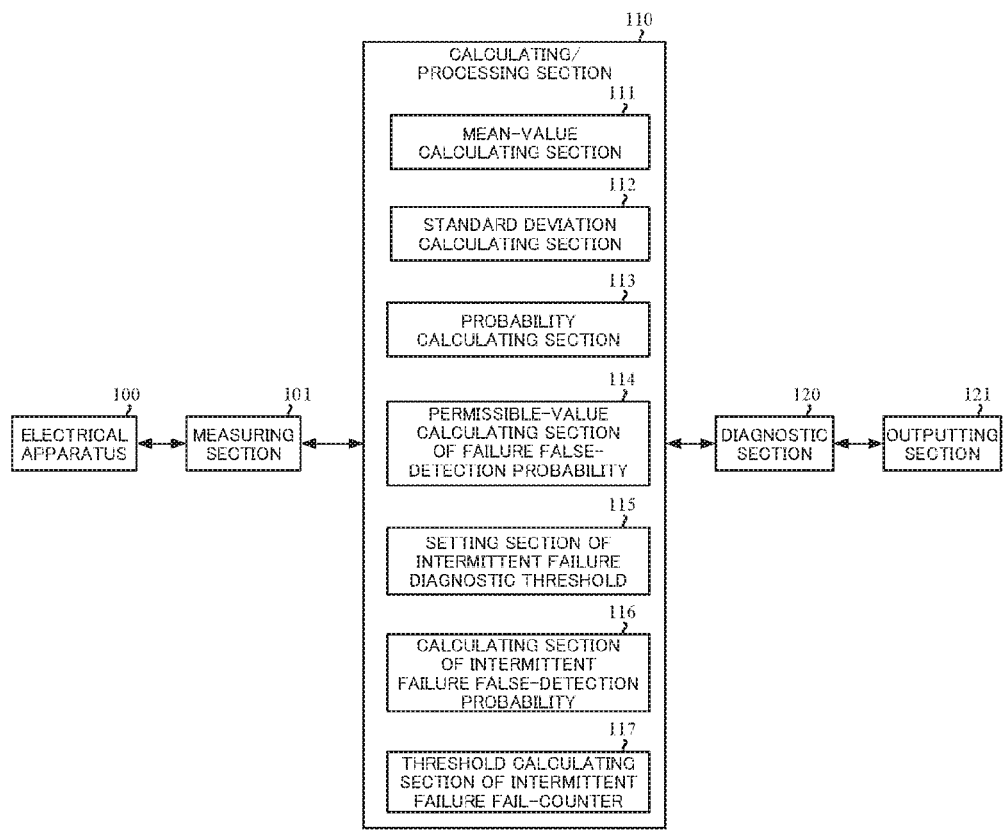
FIG. 6 is a block diagram showing a constitution example (the first embodiment) according to the present invention.

FIG. 6 shows a constitution example of the first embodiment of the present invention. As shown in FIG. 6, the electrical apparatus 100 such as the electric power steering apparatus is provided with a measuring section 101 to measure (detect), for example at every 1 ms, the physical amount such as the current and the voltage at the normal state, and the measured values (the detected values) measured (detected) at the measuring section 101 are inputted into a calculating/processing section 110 comprising a CPU, a memory and so on.

The calculating/processing section 110 comprises a mean-value calculating section 111 to calculate a mean value of the measured values measured at the measuring section 101 at the normal state, a standard deviation calculating section 112 to calculate a standard deviation of the measured values, a probability calculating section 113 to calculate the probability in accordance with a predetermined expression, a permissible-value calculating section 114 of the failure false-detection probability to calculate a permissible-value of the failure false-detection probability, a setting section 115 of the intermittent failure diagnostic threshold to seta desired intermittent failure diagnostic threshold, a calculating section 116 of the intermittent failure false-detection probability to calculate the false-detection probability of the intermittent failure, and a threshold calculating section 117 of the intermittent failure to calculate an intermittent failure fail-counter threshold. The voltage or the like on a predetermined region are measured at the measuring section 101 at an operating time of the electrical apparatus 100, the measured values are inputted into the calculating/processing section 110 as the diagnostic values.

Further, to the calculating/processing section 110, a diagnostic section 120 to diagnose the normality, the failure and the intermittent failure of the electrical apparatus 100 based on a calculated/processed result at the calculating/processing section 110 is connected. The diagnosed result is inputted into an outputting section 121 such as a display, a printer or the like.

Figure 7:
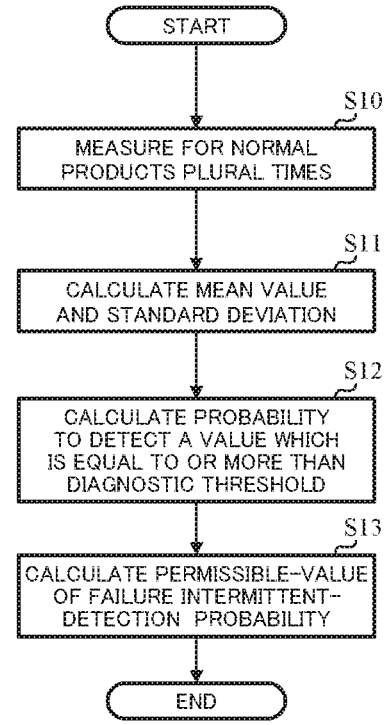
FIG. 7 is a flow chart showing a leading example of the permissible value for the failure false-detection probability.

In such the constitution, the calculation of the permissible value α of the failure false-detection probability will be described with reference to a flow chart of FIG. 7.

First, regarding the normal products of the electrical apparatus 100, the measuring section 101 measures (detects) the voltage and so on at the predetermined position in plural times (Step S10), the mean value of the measured values (the detected values) is calculated at the mean-value calculating section 111, and the standard deviation is calculated at the standard deviation calculating section 112 (Step S11). The above failure threshold is also set in advance for the upper-limit side, or the lower-limit side or both sides in the present invention, the probability calculating section 113 calculates the probability to detect a value which is equal to or more than the failure threshold based on the mean value and the standard deviation obtained at the above Step 11 (Step S12). The probability calculation utilizes, for example, the way disclosed in Patent Document 1. This obtained probability is a probability to detect at one try (one time measurement) the value which is equal to or more than the failure threshold, and the permissible-value calculating section 114 calculates the permissible value α of the failure false-detection probability in accordance with the following expression 1 by utilizing the above probability (Step S13).

The permissible value α of the failure false-detection probability=$P_F^n$ (Expression 1)

where, "$P_F$" is the probability to detect, at one try, the value which is equal to or more than the failure threshold, and "n" is a fail-counter threshold (unit is a number).

Figure 8:
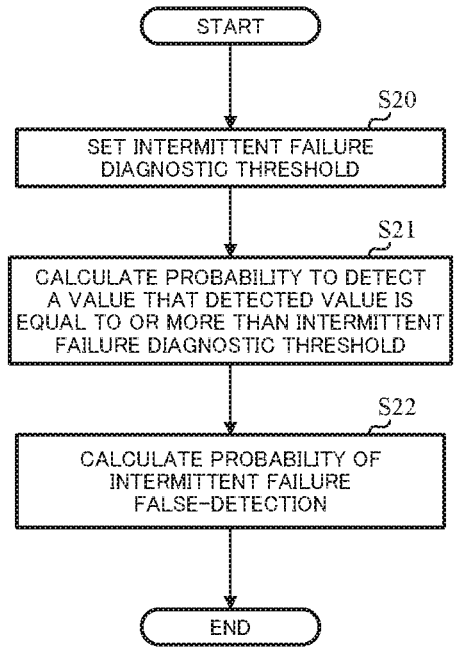
FIG. 8 is a flow chart showing a setting example of the intermittent failure diagnostic threshold and the leading example of the intermittent failure false-detection probability.

Next, the setting of the intermittent failure diagnostic threshold and the calculation of the intermittent failure false-detection probability β will be described with reference to a flow chart of FIG. 8.

First, the setting section 115 of the intermittent failure diagnostic threshold sets the intermittent failure diagnostic threshold (Step S20). The intermittent failure diagnostic threshold is a voluntary value between the mean value (the normal value) and the upper-limit side failure threshold, or between the mean value and the lower-limit side failure threshold, or between the mean value and two failure thresholds of the lower-limit side and upper-limit side. Next, the probability calculating section 113 obtains the probability to detect a value that the measured value is equal to or more than the set intermittent failure diagnostic threshold at one measurement by a calculation with a normal distribution chart or the like (Step S21). The probability obtained at the above Step S21 is a probability to detect at one try (one time measurement) the value which is equal to or more than the intermittent failure diagnostic threshold or which is equal to or less than the same, and the calculating section 116 of the intermittent failure false-detection probability calculates the intermittent failure false-detection probability β in accordance with the following expression 2 by utilizing the above probability (Step S22).

The intermittent failure false-detection probability β=$P_T^N$ (Expression 2)

where, "$P_T$" is the probability to detect, atone try, the value which is equal to or more than the intermittent failure diagnostic threshold, and "N" is a fail-counter threshold (unit is a number).

Next, the threshold calculating section 117 of the intermittent failure fail-counter calculates an intermittent failure fail-counter threshold N so as to coincide the intermittent failure detection probability $P_T^N$ obtained stated above and the permissible value $P_F^n$ of the failure false-detection probability. According to the condition expressed in the following expression 3, the following expression 4 is led.

$P_T^N = P_F^n$ (Expression 3)

$\log P_T^N = \log P_F^n$ (Expression 4)

Consequently, the following expression 5 is established.

$N^* \log P_T = n^* \log P_F$ (Expression 5)

Therefore, the intermittent failure fail-counter threshold N is obtained from the following expression 6.

$N = (n^* \log P_F)/(\log P_T)$ (Expression 6)

Assuming that the probability to detect the value which is equal to or more than (or equal to or less than) the failure threshold for the normal products is $P_F$, the fail-counter threshold in the conventional diagnosis is n, the probability to detect the value which is equal to or more than (or equal to or less than) the intermittent failure diagnostic threshold is $P_T$ and the intermittent failure fail-counter threshold is N, the diagnostic section 120 can detect the intermittent failure with keeping the anti-false-detection characteristic of the conventional diagnosis by setting the probability $P_T$ establishing the above expression 6 and the intermittent failure fail-counter threshold N. The diagnosed result is outputted from the outputting section 121. Although the intermittent failure fail-counter threshold is explained with the counting value, it may be a measurement of the time.

These counting values (times) can be set at every failure region, the values may be stored and further may be integrated for the usage, or the values are may be reset. Further, a lighting pattern of a failure indicator of the vehicle may be changed for discriminating the permanent failure and the intermittent failure. For example, the permanent failure is conventionally lighted and the intermittent failure turns on and off.

As stated above, the present invention (the first embodiment) sets the threshold (the intermittent failure diagnostic threshold) for detecting the intermittent failure inside smaller than the upper-limit side failure threshold, and adds the diagnostic function be capable of detecting the intermittent failure which does not exceed the failure threshold in addition to the continuous failure.

Figure 9:
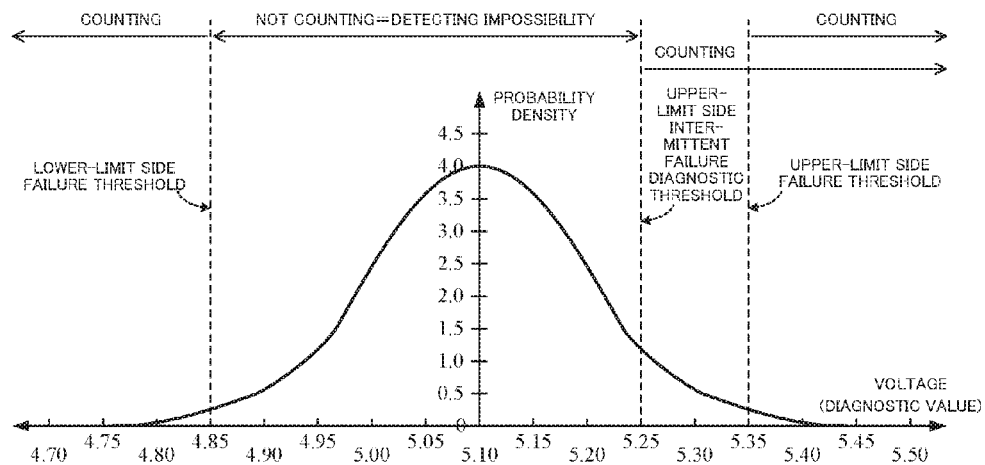
FIG. 9 is a characteristic diagram showing an operational example (the first embodiment) of the present invention.

As concretely shown in FIG. 9, this case is that the intermittent failure diagnostic threshold "5.25V" which is greater than the normal value (the mean value) "5.10V" and which is smaller than the upper-limit side failure threshold "5.35V" is set as the upper-limit side intermittent failure diagnostic threshold. A region of the detecting impossibility that the fail-counter does not count becomes narrow by setting thus intermittent failure diagnostic threshold. The fail-counter for the intermittent failure detection counts when the sum of the output voltages is equal to or more than "5.25V". Further, if the sum of the output voltages indicates the normal distribution, the probability that the measured result at one time measurement is equal to or more than "5.25V" is led as "0.0668" by the calculation. Moreover, it is necessary to actually investigate the mean value and the standard deviation of the measured values on the normal products in order to perform the above calculation (the example is the case that the mean value is "5.1V" and the standard deviation is "0.1V"). Similarly, the probability that the measured result is equal to or more than the conventional threshold ("5.35V") is also led as "0.0062" by the calculation. If a time that the output voltage is equal to or more than the failure threshold "5.35V" is kept during 500 ms, the failure is settled since the counting is continuously performed in 500 times. The probability of this time is $(0.0062)^{500}$.

Next, the counting value at the time settling the intermittent failure is set. The guidance of the setting is a way so as not to increase the false-detection probability by comparing the former way even if the intermittent failure detection function is added. Concretely, the probability to settle the intermittent failure makes the probability of the conventional failure settlement same.

Assuming the fail counting value N for the intermittent failure detection, the counting value N so as to establish the following expression 7 is obtained.

$$(0.0668)^N = (0.0062)^{500} \quad \text{(Expression 7)}$$

According to the above expression 7, the fail counting value N is obtained by the following expression 8.

$$N = 500 \times (\log 0.0062/\log 0.0668) = 939.23 \quad \text{(Expression 8)}$$

Accordingly, the fail counting value N for the intermittent failure detection is set as 939 times. In this way, when the value which is equal to or more than the intermittent failure diagnostic threshold is continuously kept during 939 ms, the intermittent failure is settled. The setting and the detection of the time may be used instead of the fail counting value N for the intermittent failure detection.

In a certain diagnosis, when the measuring value varies depending on the system state (in the electric power steering apparatus, a value varies at a motor rotation time and at a motor static state time), and when only values measured at a determined state are desired to utilize (in the electric power steering apparatus, at a time when the motor is not rotated, and so on), the counting becomes discontinuous. Further, in a case desired that the counter is not reset even if the power supply is OFF, it is also necessary to store the counting value in a non-volatile memory.

Figure 10:
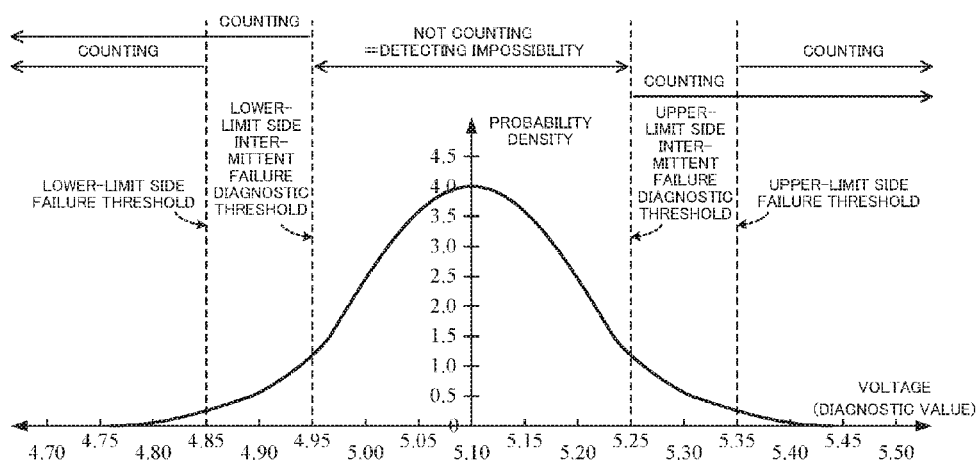
FIG. 10 is a characteristic diagram showing an operational example (the first embodiment) of the present invention.

Although the upper-limit side intermittent failure diagnostic threshold is set at the upper-limit side in the embodiment, the lower-limit side intermittent failure diagnostic threshold may be set at the lower-limit side as shown in FIG. 10, and the intermittent failure diagnostic threshold is set at any one of the upper-limit side and the lower-limit side, or at both sides.

In the above first embodiment, since it is considered as the normality without reservation when the diagnostic value (the sum of the output voltages) presents the mean value and the value which is equal to or more than the mean value (at the lower-limit side, equal to or less than the mean value) is not permissible as the setting region of the upper-limit intermittent failure diagnostic threshold, it is impossible to detect the abnormal state that the diagnostic value is fixed at the region of the detecting impossibility including the mean value. Even if the diagnostic value presents the mean value, it is considered as the abnormal state that the diagnostic value is fixed when the same value continues a long term. Therefore, the second embodiment adds the detection function of the above abnormal state.

Figure 11:
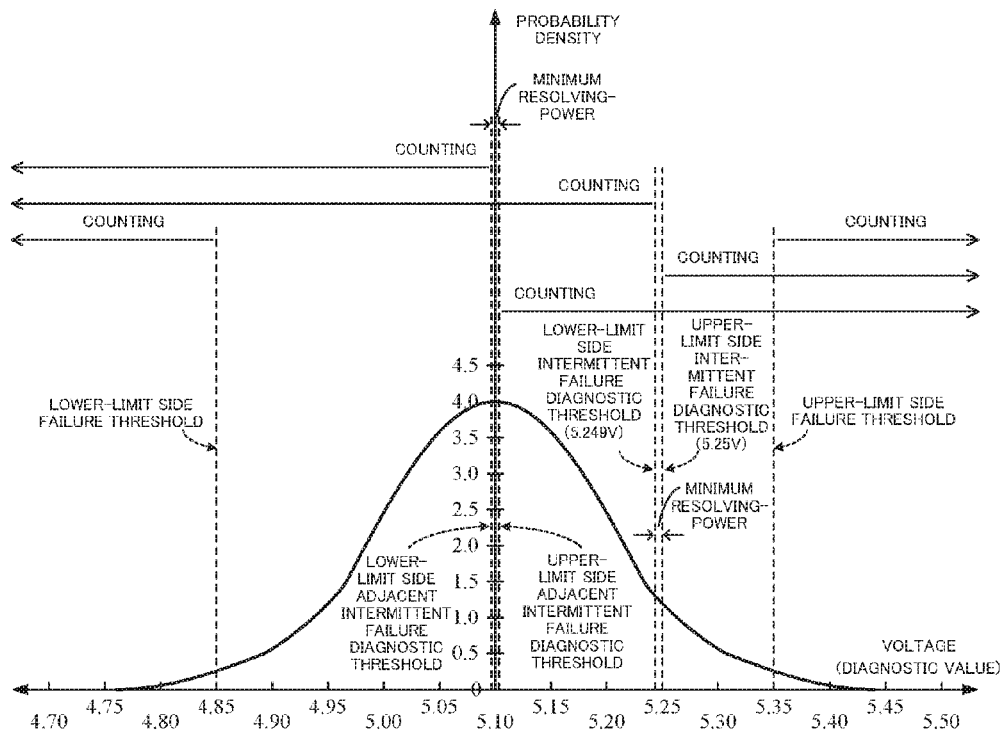
FIG. 11 is a characteristic diagram showing an operational example (the second embodiment) of the present invention.

The second embodiment sets the intermittent failure diagnostic thresholds of the upper-limit side and the lower-limit side separated (with adjacent) by the minimum resolving-power unit as shown in FIG. 11 by allowing the values which are equal to or more than (or equal to or less than) the mean value. The second embodiment sets the intermittent failure diagnostic thresholds at voluntary upper-limit side and the lower-limit side, and sets a value separated by the minimum varying amount (the resolving-power) being able to detect at the lower-limit side (or the upper-limit side) as the lower-limit side (or the upper-limit side) intermittent failure diagnostic threshold. In this way, no counting region disappears, and the detection on the abnormal state in which the diagnostic value is fixed becomes possible for the whole region where the diagnostic values are capable of existence. The lower-limit side intermittent failure diagnostic threshold and the fail counting value for the lower-limit side intermittent failure are set based on the set upper-limit side intermittent failure diagnostic threshold. At the time, the lower-limit side intermittent failure diagnostic threshold is set to the value (adjacent value) separated by the upper-limit side intermittent failure diagnostic threshold and the detection resolving-power.

Figure 12:
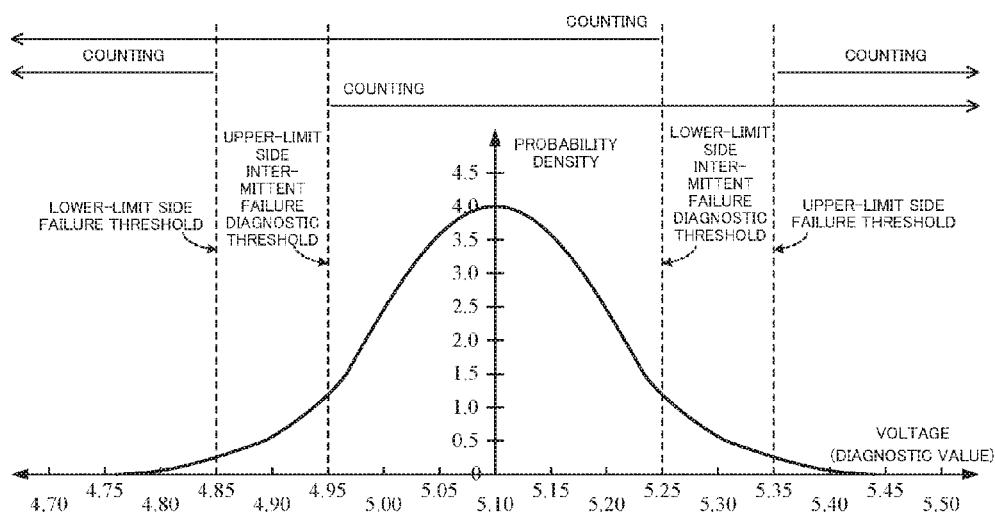
FIG. 12 is a characteristic diagram showing another operational example (the second embodiment) of the present invention.
Figure 13:
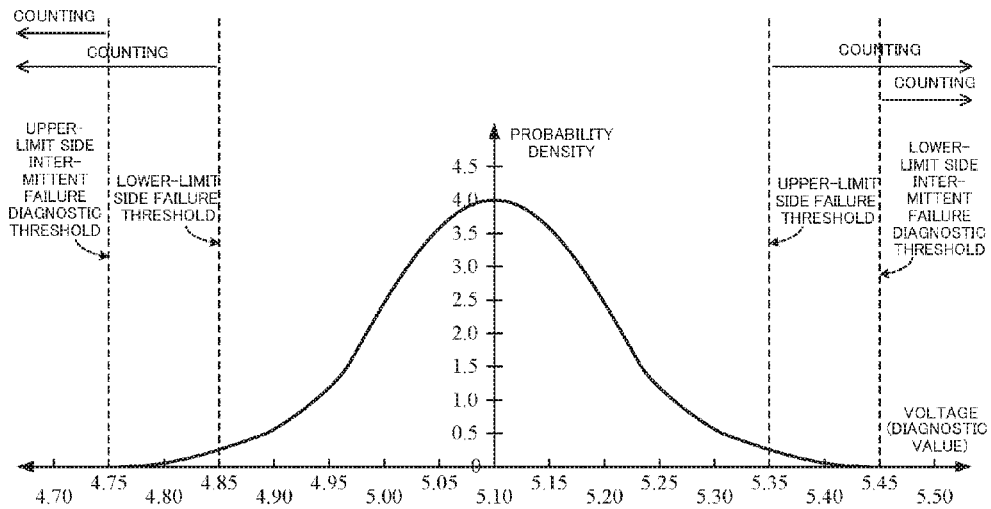
FIG. 13 is a characteristic diagram showing another operational example (the second embodiment) of the present invention.

Further, the intermittent failure diagnostic thresholds of an upper side and a lower side are mutually able to set without restrictions of a size relation (refer to FIG. 12 and FIG. 13). FIG. 12 shows a case that the upper-limit side intermittent failure diagnostic threshold and the lower-limit side intermittent failure diagnostic threshold are inverted, and FIG. 13 does a case that the intermittent failure diagnostic threshold is set outside of the failure threshold. This reason is that the false-fail settlement probability to settle with the upper side and lower side intermittent failure diagnostic thresholds is determined by the false-fail settlement probability of the conventional failure, and they do not mutually interfere.

According to the above reason, although the intermittent failure diagnostic thresholds of the upper-limit side and the lower-limit side are respectively capable of setting to voluntary values, they are desired to adjacently set due to a practical reason. This reason is that in a case to detect the abnormal state being the diagnostic fixing on the whole region of the diagnostic values, it is possible to, in a small value, set the counting value for settling the intermittent failure by adjacently setting the thresholds. In this connection, the fail counter used in the diagnostic system is capable of using a counter of which countable value is small, and the cost is suppressed.

As shown in FIG. 11, in the second embodiment, when the upper-limit side intermittent failure diagnostic threshold is the mean value ("5.1V"), the detecting impossibility region (region(s) being not counted) disappears by getting a relation of "the lower-limit side intermittent failure diagnostic threshold=the upper-limit side intermittent failure diagnostic threshold−the minimum resolving-power of the detected voltages" (=5.1−0.001=5.099V), and the abnormal detection being the diagnostic value fixing becomes possible for the whole region. But, it is a case that the detection resolving-power of the diagnostic values on the present diagnosis is "0.001V".

Figure 14:
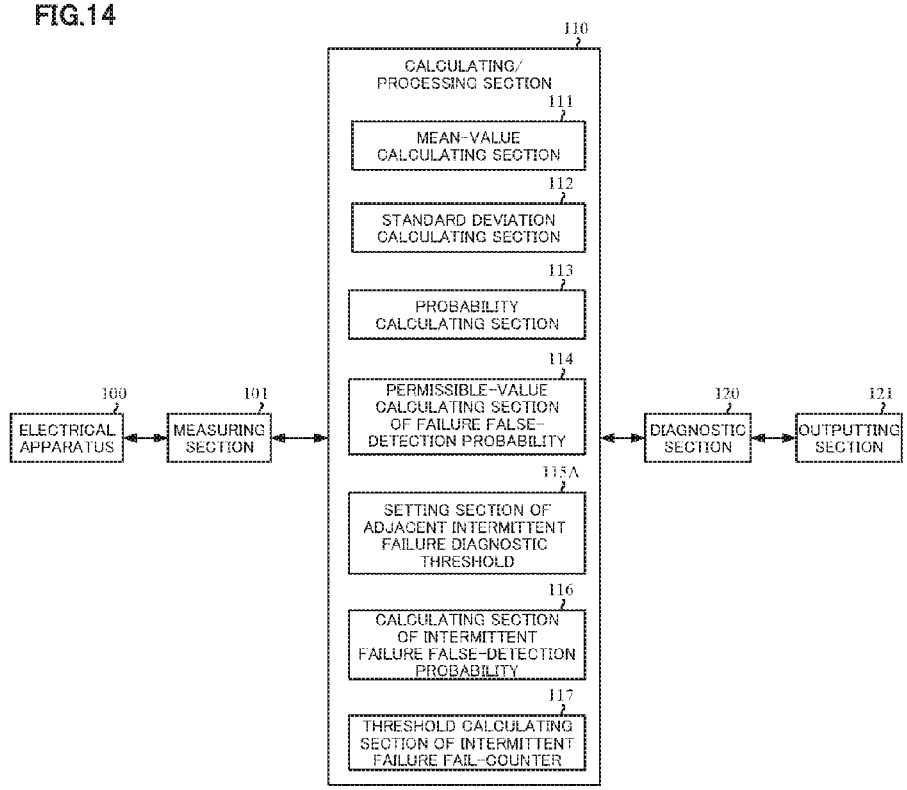
FIG. 14 is a block diagram showing a constitution example (the second embodiment) of the present invention.

FIG. 14 shows the constitution example of the second embodiment in correspondence with FIG. 6, there is provided a setting section 115A of adjacent intermittent failure diagnostic threshold, and the adjacent intermittent failure diagnostic threshold is set by setting the upper-limit side intermittent failure diagnostic threshold and the lower-limit intermittent failure diagnostic threshold (=the upper-limit side intermittent failure diagnostic threshold−the minimum resolving-power of the detected voltages).

Furthermore, as shown in FIG. 11, if the upper-limit side intermittent failure diagnostic threshold is set to, for example, "5.25V", the lower-limit intermittent failure diagnostic threshold=the upper-limit side intermittent failure diagnostic threshold−the detection resolving-power=(5.25−0.001)V=5.249V is obtained, and the lower-limit intermittent failure diagnostic threshold becomes to 5.249V (refer to FIG. 11). In addition, in the case that the size relation of the upper-limit side intermittent failure diagnostic threshold and the lower-limit side intermittent failure diagnostic threshold is inverted as sown in FIG. 12, for example, in the case that the upper-limit side intermittent failure diagnostic threshold is "4.85V" and the lower-limit side intermittent failure diagnostic threshold is "5.25V", the false-fail settlement probabilities to settle due to the intermittent failure diagnostic threshold are determined based on the respective false-fail settlement probabilities for the upper-limit side and the lower-limit side on the conventional failure. Since these probabilities do not mutually interfere, the intermittent failure diagnostic thresholds of the upper-limit side and the lower-limit side are not mutually restricted on the size relation.

If the false-fail settlement probability on the conventional failure is same with the false-fail settlement probability on the intermittent failure, it is possible to set the intermittent failure diagnostic threshold outside of the conventional failure threshold as shown in FIG. 13. In this case, the counting value to settle the intermittent failure becomes smaller than the same of the conventional failure. However, in this case, because the operation is left from the object to detect the intermittent failure, it is not called as the intermittent failure diagnostic threshold and is named, for example, as a false-failure equivalent-convergence threshold. As an effect of this case, a time shortening (speeding up of the failure detection) till the failure settlement is given.

Next, a concrete example as shown in FIG. 11 that the upper-limit side intermittent failure diagnostic threshold "5.25V" and the lower-limit side intermittent failure diagnostic threshold "5.249V" are respectively set will be explained. In this case, the probability that once measured result becomes a value which is equal to or less than "5.249V", is led as "0.9319" by the calculation. Similarly, the probability becoming to a value which is equal to or less than the lower-limit side conventional failure threshold (equal to or less than "4.85V"), is led as "0.0062" by the calculation. If a time that the output voltages are equal to or more than the failure threshold "4.85V" is kept during 500 ms, the failure is settled since the counting is continuously performed in 500 times. The probability of this time is $(0.0062)^{500}$.

Next, the counting value at the time settling the lower-limit side intermittent failure is set. Concretely, the probability to settle the lower-limit side intermittent failure makes the probability of the lower-limit side conventional failure settlement same.

Assuming the fail counting value N for the lower-limit side intermittent failure detection, the counting value N so as to establish the following expression 9 is obtained.

$(0.9319)^N=(0.0062)^{500}$ (Expression 9)

According to the above expression 9, the fail counting value N is obtained by the following expression 10.

$N=500\times(\log 0.0062/\log 0.9319)=36036.89$ (Expression 10)

Accordingly, the fail counting value N for the lower-limit side intermittent failure detection is set as 36036 times. In this way, if the value which is equal to or more than the lower-limit intermittent failure diagnostic threshold is kept during 36036 ms, the lower-limit side intermittent failure is settled.

Although the above embodiments explain on the detection of the voltage, the physical amount such as a current, a rotational number and so on are similarly used as the diagnostic value. Furthermore, if a case that the intermittent failure detecting system according to the present invention is applied to the electric power steering apparatus, the detection object of the diagnosis is respective phase currents, a torque value of a torque sensor, a battery voltage, a driving-circuit applying voltage and so on, and it is possible to provide a high performance electric power steering apparatus being capable of detecting the both failure and the intermittent failure.

Besides, the numerical values such as the voltage value or the like stated above are wholly for the convenience and are suitably changeable.

EXPLANATION OF REFERENCE NUMERALS 1 handle
2 column shaft (steering shaft, handle shaft)
10 torque sensor
12 vehicle speed sensor
13 battery
20 motor
30 control unit (ECU)
31 current command value calculating section
32 maximum output limiting section
34 PI-control section
35 PWM-control section
36 motor driving circuit
100 electrical apparatus
101 measuring section
110 calculating/processing section
111 mean-value calculating section
112 standard deviation calculating section
113 probability calculating section
114 permissible-value calculating section
115 setting section of intermittent failure diagnostic threshold
116 calculating section of intermittent failure false-detection probability
117 threshold calculating section of intermittent failure fail-counter
120 diagnostic section
121 outputting section

The invention claimed is:
1. An intermittent failure diagnostic detection system for detecting failures in at least one electrical apparatus, said intermittent failure diagnosis detection system comprising a fail-counter to detect a first failure for an ordinary diagnosis by calculating a normal distribution based on a mean value and a standard deviation of measured values of an output normal state voltage of said at least one electrical apparatus, by setting at least one output voltage failure threshold as a diagnostic threshold of measured output voltage values of said at least one electrical apparatus, and by measuring a number or a time of said measured output voltage values of said at least one electrical apparatus exceeding said output voltage failure threshold:
wherein said intermittent failure diagnostic detection system sets an intermittent output voltage failure diagnostic threshold for an intermittent failure diagnosis between said mean value of an output normal state voltage and said output voltage failure threshold, and said fail-counter measures a number or a time that measured output voltage values of said at least one electrical apparatus exceed said intermittent output voltage failure diagnostic threshold;

wherein said intermittent failure diagnostic system sets a counting value or a time to detect a second failure for an intermittent failure diagnosis, that satisfies the relationship $$N=(n*\log P_F)/(\log P_T)$$

where a counting value of said fail-counter to detect said first failure for said ordinary diagnosis is n, a counting value of said fail-counter to detect said second failure for said intermittent failure diagnosis is N, a permissible value on a false-failure probability of said ordinary diagnosis is $P_F^n$ and a permissible value on a false-failure probability of said intermittent failure diagnosis is $P_T^N$, so as to coincide said permissible value on said false-failure probability of said ordinary diagnosis with said permissible value on said false-failure probability of said intermittent failure diagnosis;

wherein said intermittent failure diagnostic system detects an occurrence of an intermittent failure when said counting value of said fail-counter to detect said second failure for said intermittent failure diagnosis is said counting;

wherein the electrical apparatus comprises an electric power steering apparatus; and wherein the detection of said first failure for an ordinary diagnosis and said detection of said second failure for an intermittent diagnosis are outputted to a display.

2. The intermittent failure diagnostic detection system according to claim 1, wherein said output voltage failure threshold is set based on a physical requirement 1.

3. The intermittent failure diagnostic detection system according to claim 2, wherein said physical requirement 1 is a hard ware characteristic or a usage condition of said intermittent failure diagnosis system.

4. The intermittent failure diagnostic detection system according to claim 1, wherein said counting value or said time to detect said second failure for said intermittent failure detection diagnosis is set based on a physical requirement 2.

5. The intermittent failure diagnostic detection system according to claim 4, wherein said physical requirement 2 is at least one of a hard ware characteristic, a usage condition said intermittent failure diagnostic system, a supposing impulse-noise width and a continuous permissible time on a functional safety.

6. The intermittent failure diagnostic detection system according to claim 1, wherein said output voltage failure thresholds are set at an upper-limit side and a lower-limit side, and at least one of said intermittent output voltage failure diagnostic threshold is set between said failure thresholds and said mean-value.

7. The intermittent failure diagnostic detection system according to claim 1, wherein said failure counting is continuously or discontinuously performed.

8. The intermittent failure diagnostic detection system according to claim 1, wherein said intermittent output voltage failure diagnostic threshold is shifted to a whole region of diagnostic values by a detection resolving-power unit and is set.

\* \* \* \* \*